United States Patent Office 3,228,324
Patented Jan. 11, 1966

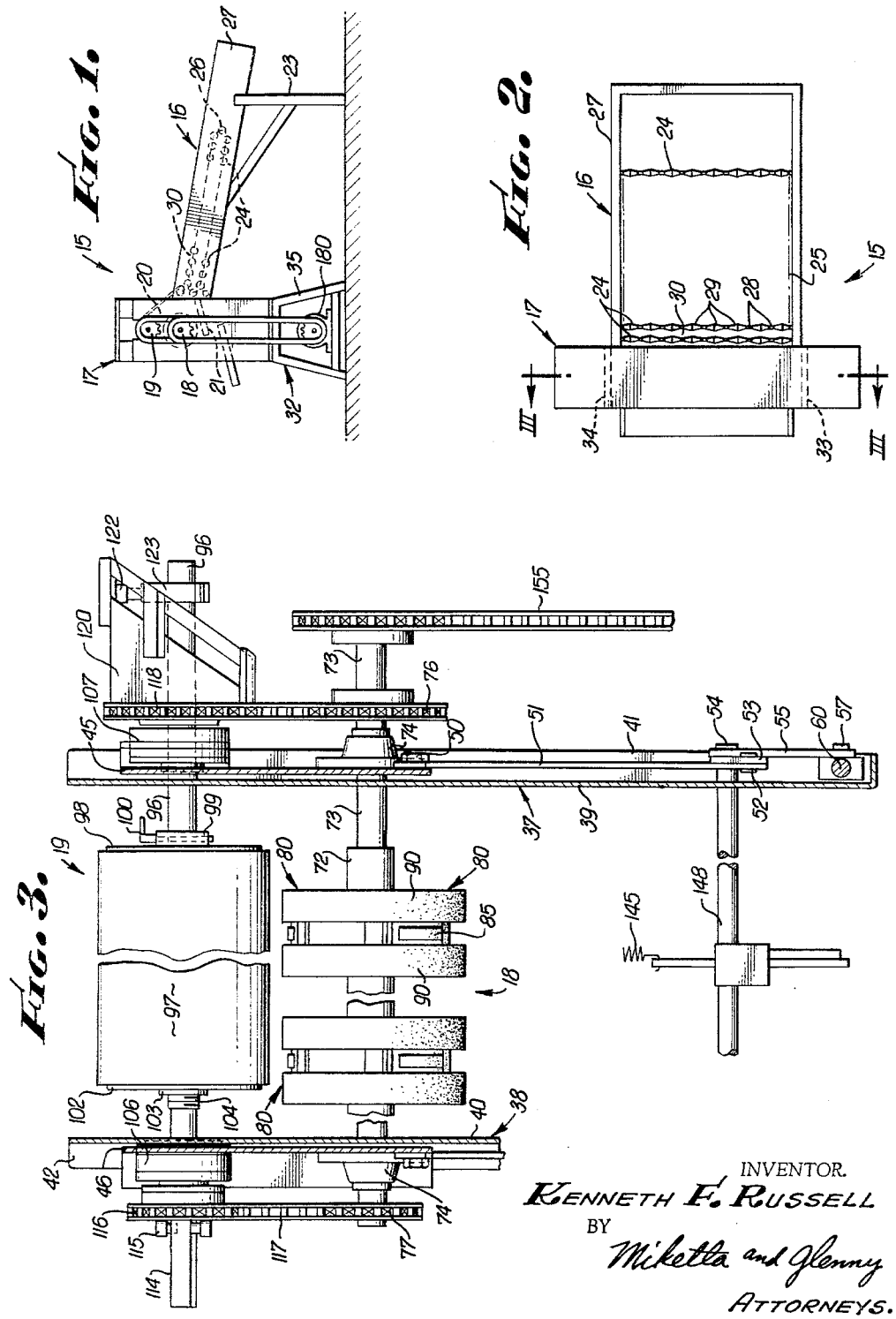

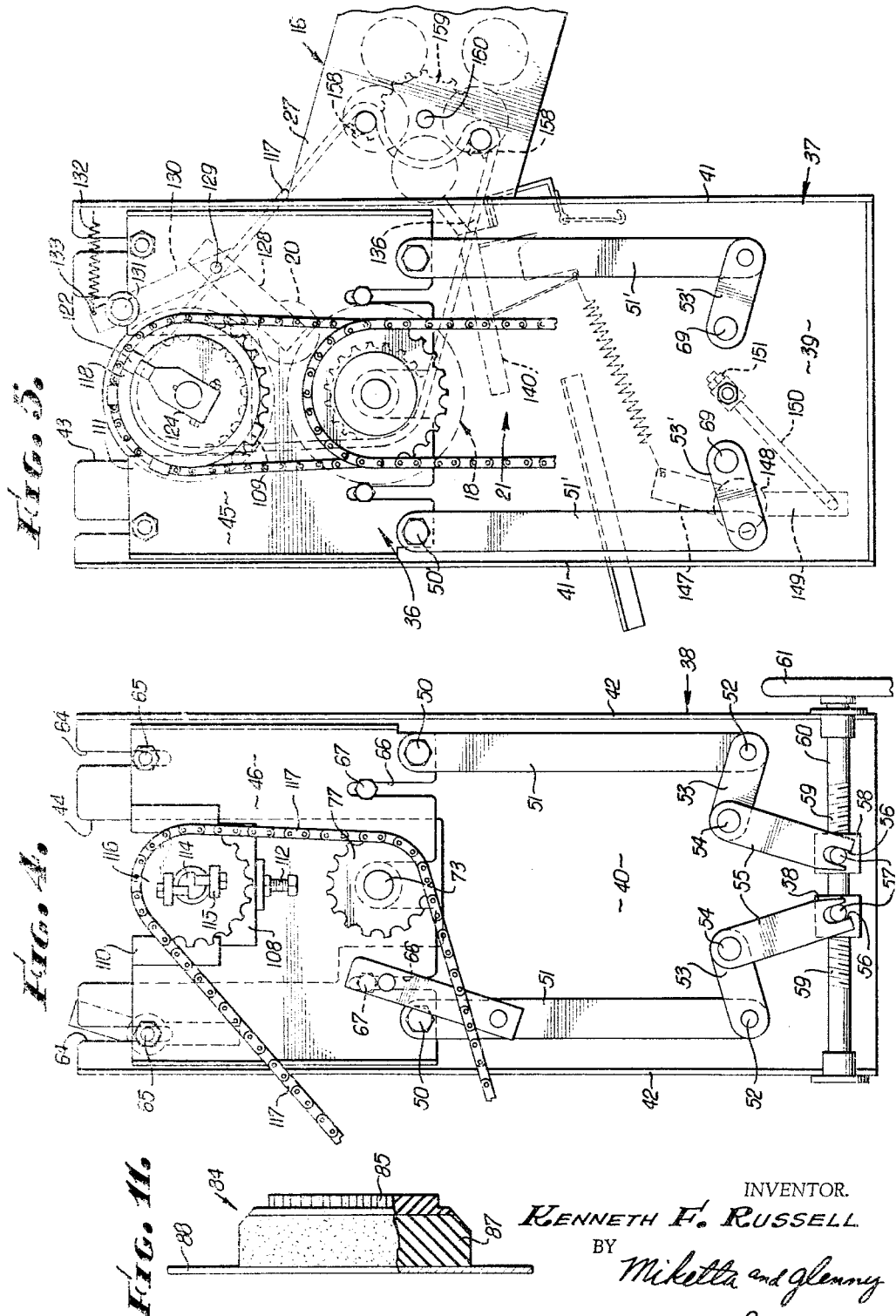

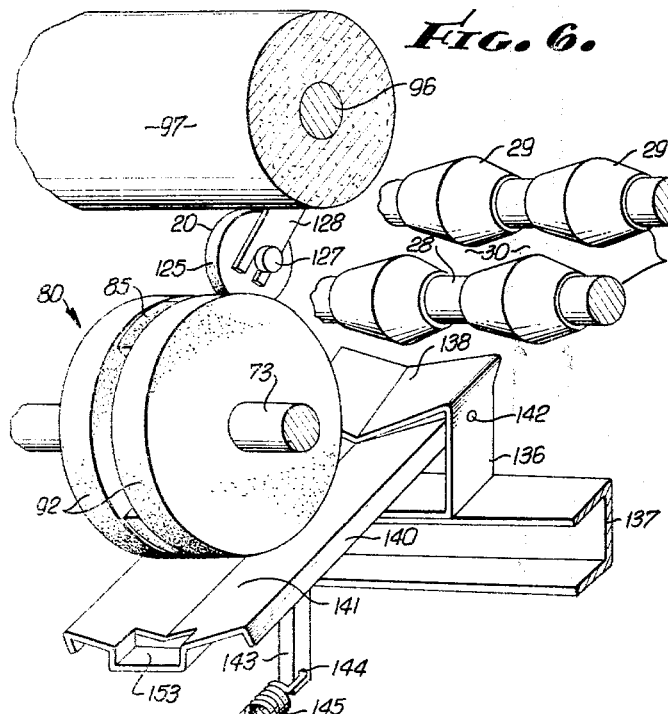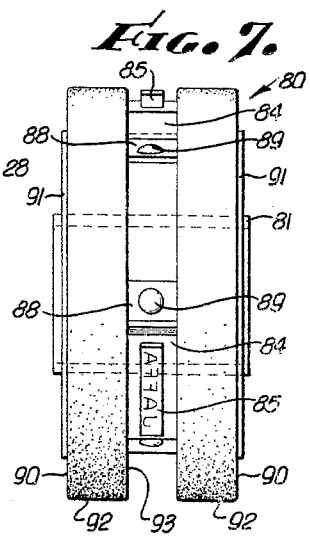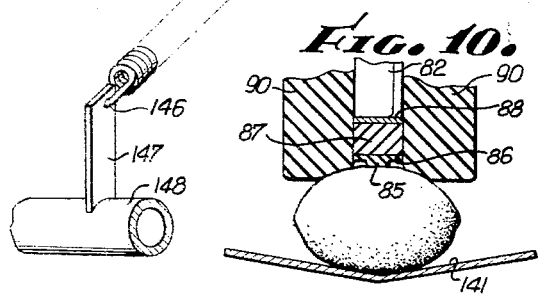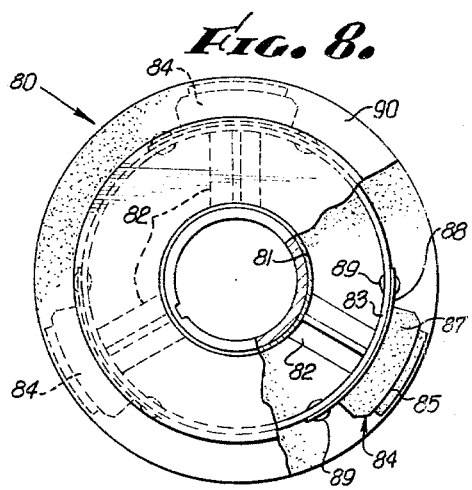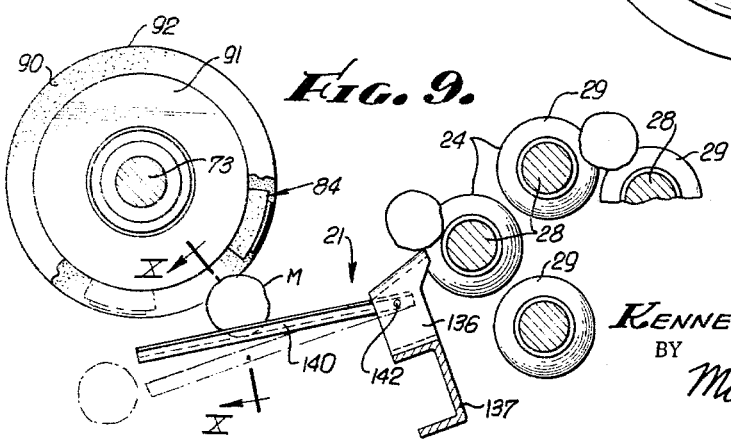

3,228,324
STAMPING MACHINE FOR FRUIT AND THE LIKE
Kenneth F. Russell, Pomona, Calif., assignor to Brogdex Company, Pomona, Calif., a corporation of California
Filed Dec. 8, 1961, Ser. No. 157,983
6 Claims. (Cl. 101—40)

This invention relates to a machine for marking or stamping articles having irregular surface configurations such as fruit and produce, including lemons, oranges, grapefruit, potatoes, and the like. The invention, particularly relates to a novel marking assembly adapted to control the movement of the article being marked during the marking operation.

One of the principal problems in marking articles such as fruit, which will hereafter be exemplarily referred to, is to bring a die face and a surface of the fruit into proper interfacial relation so that a mark may be made on the fruit surface which is clear, definite, complete, and uniformly imprinted. Fruit, even when already sized, will still present minor variations and irregularities in surface configurations to which a marking machine must be adaptable without readjustment of relationship between inking roll, marking roll and the support means for holding the fruit in marking position. Examples of prior proposed machines which have been concerned with this problem and have stamped or marked fruit adjacent the top end of a conveyor means by various devices and arrangements, are shown in U.S. Patents 1,501,817, 2,424,006, and 2,987,991. The present invention embodies a construction and a mode of operation of a fruit-marking machine which includes improvements and advantages over prior proposed machines as will be apparent to those skilled in the art.

Generally speaking, the present invention contemplates a marking machine for fruit or like articles wherein a virtually free-rolling fruit is moved at a selected velocity and is yieldably supported in a marking zone and wherein a marking roll means includes means at the marking zone for gripping and propelling such a free, yieldably supported fruit into marking relation with a die member carried by the marking roll means. Such an exemplary marking machine may include a conveyor means for advancing and orienting a plurality of fruit to be marked, a marking assembly including a marking roll means spaced from one end of said conveyor means, and a selectively inclined trough means extending between the discharge end of the conveyor means and the marking roll means for guiding and aligning free-rolling fruit to the marking roll means at a selected velocity. The marking roll means may include circumferential soft, yieldable, resilient, axially spaced gripping surfaces defining a groove or channel therebetween into which a die member is carried with its die face below the gripping surfaces. A rolling fruit is initially engaged by the soft, yieldable gripping surfaces and controllably brought thereby into virtually the same peripheral rate of movement as that of the die face, and grippingly held and propelled by said gripping surfaces through a marking zone where interfacial contact between the die face and the fruit surface is made without relative movement therebetween, and is then discharged from the marking zone with a uniformly imprinted mark thereon. Means are provided for correlating the rate of delivery of fruit by the conveyor means and the rate of rotation of the marking roll means so that each of the plurality of fruit discharged from the conveyor means is properly advanced to the marking zone and marked by the die member.

The primary object of this invention, therefore, is to disclose and provide a marking or stamping machine for articles such as fruit and produce, which embodies a novel mode of operation and construction.

An important object of the invention is to disclose and provide a fruit-marking machine wherein fruit is controllably gripped and propelled through a marking zone under preselected imprinting pressure.

Another object of the invention is to disclose and provide a marking roll means for such a marking machine wherein said roll means includes a die member positioned within an annular groove formed by and within a cylindrical body member of the deformable, soft, resilient material, having spaced circumferential surfaces disposed radially outwardly of the die face of the die member.

A further object of the invention is to disclose and provide for a marking roll means such as described above, a novel means for inking the die faces of such die members.

Other objects of this invention, briefly, include the provision of a trough means for fruit discharged from a conveyor means, whereby selected velocity may be imparted to a fruit; a trough means so constructed and arranged that imprinting pressure will be virtually the same even though there may be some variance in size of a fruit being advanced along said trough means; a means for adjusting the relationship between a marking roll means and the trough means; a means for adjusting the relationship between an inking roll means and the marking roll means; and means for inking die faces of die members disposed below the surface of the marking roll means.

Another specific important object of this invention is to provide a novel arrangement of a rotatable die, an inking roll means, and a transfer wheel therebetween wherein the transfer wheel normally contacts the inking roll and contacts the die face while out of contact with the inking roll, and wherein the transfer wheel is adjustably biased so that selected pressure contact with the die face and inking roll is made.

Numerous other advantages and objects of this invention will be readily apparent from the following description of the drawings in which an exemplary embodiment of this invention is shown.

In the drawings:

FIG. 1 is a side view of a marking machine embodying this invention.

FIG. 2 is a top plan view of FIG. 1.

FIG. 3 is a fragmentary sectional view taken in a transverse vertical plane indicated by lines III—III of FIG. 2.

FIG. 4 is a fragmentary side view of the marking means as viewed from the top of FIG. 2.

FIG. 5 is a fragmentary side view of the marking means as viewed from the bottom of FIG. 2.

FIG. 6 is a fragmentary enlarged perspective view of the marking assembly and end of a conveyor embodying the invention.

FIG. 7 is a front view of a marking wheel assembly.

FIG. 8 is a side view of FIG. 7 partly in section.

FIG. 9 is a fragmentary schematic view of a marking roll and trough means.

FIG. 10 is a fragmentary sectional view taken in the planes indicated by lines X—X of FIG. 9.

FIG. 11 is an elevational view partly in section of a die member.

In the drawings, a marking machine or apparatus embodying this invention is generally indicated at 15 and may generally comprise a conveyor means 16 for delivering articles to be marked to a marking assembly or means 17. The marking means 17 briefly includes a marking roll 18 rotatable below an inking roll 19 from which ink is transferred by means of an ink transfer wheel 20. Extending from the end of conveyor means 16 and beneath marking roll 18 is a trough means 21 particularly arranged with respect to marking roll 18 and the conveyor means 16 for directing and guiding articles to be marked beneath the marking roll 18.

It will be understood that articles to be marked by machine 15 may include articles of various shapes and sizes with variant surface irregularities and adapted to be oriented with respect to at least one axis of the article, normally its long axis. Machine 15 is particularly adapted for marking articles such as fruit and produce, including lemons, oranges, grapefruit, potatoes, and the like.

The conveyor means 16 may comprise a suitable frame means generally indicated at 23 including suitable vertical, horizontal and inclined frame members for supporting an endless type of conveyor. In this example, conveyor means 16 comprises a plurality of spaced parallel conveyor rollers 24 rotatably connected at their ends to suitable side chain means 25 supported at opposite ends by ends sprockets 26 and guided along their length by conveyor side frame members 27. Each conveyor roll 24 is similarly constructed and each comprises a shaft 28 provided with a plurality of axially spaced selectively configured grommets 29 of suitable material such as rubber. The axially spaced grommets 29 are aligned with respect to the longitudinal axis of the conveyor means and provide a plurality of fruit-holding pockets 30 between adjacent conveyor rollers 24.

Depending on the type of fruit being marked, conveyor rollers 24 may be positively rotated in either direction by top or bottom friction receivers engageable with said rollers for a portion of the length of the conveyor in order to facilitate rapid orientation and positioning of the fruit in pockets 30 with respect to one of its axes. To further assist such orientation and rapid location of fruit in conveyor pockets 30, the conveyor 16 may be slightly inclined; for example, preferably between 12 to 15 degrees with respect to the horizontal. Fruit fed by suitable means to the lower end of conveyor means 16 will be oriented, positioned in respective pockets 30, and transported to the top end of the conveyor means for discharge to marking means 17. At the top of the conveyor, the conveyor rollers are preferably not rotated so that each fruit will be at rest in a pocket 30. The selected rate of advancement of the articles on the top lay of the conveyor 16 is correlated with marking means 17, as described hereafter.

The marking assembly or means 17 is disposed adjacent to the upper end of conveyor means 16 and may comprise a frame means 32 of suitable vertical upstanding side frame members 33 and 34 and base members 35, all braced and interconnected to provide a rigid structure. The side frame members 33 and 34 carry a vertically adjustable stamping head means 36 adapted to vertically space marking roll 18 with respect to trough means 21 to adjust for variance in fruit size. The stamping head 36 may comprise upper end plates 37 and 38 of side frame members 33 and 34, respectively, said plates having side walls 39 and 40, respectively, and flanges 41 and 42, respectively, extending along bottom and side edges of walls 39 and 40. Walls 39 and 40 may be provided with relatively wide top opening vertical slots 43, 44 adapted to receive shaft ends of the rolls 18 and 19 and to permit mounting of said rolls relative to each other on vertically movable head plates 45 and 46 positioned outboardly of walls 39 and 40 and between the peripheral flanges 41 and 42, respectively.

Means for moving head plates 45 and 46 vertically with respect to the side frame members to vertically adjust head means 36 may comprise similar linkage arrangements, only one of which will be described, the other being given like reference numerals with prime signs. The bottom corner portions of plate 46 have pivotal connections as at 50 to depending parallel legs 51 having pivotal connections at their ends at 52 to inwardly extending links 53 having fixed connections at 54 at their opposite ends with upstanding drive arms 55. Drive arms 55 are provided with open ended bottom slots 56 which may slidably and pivotally engage drive pins 57 carried by nuts 58 having threaded engagement with oppositely threaded portions 59 of a drive screw 60 having one end projecting beyond flange 42 for connection with an adjusting wheel 61. The screw 60 may be mounted in suitable bearings in opposite portions of flange 42. When the adjusting wheel 61 is turned, pins 57 will move either toward or away from each other on the oppositely threaded screw portions 59 of drive screw 60. Such translational movement of the pins 57 will be transmitted to the drive arms 55, which through links 53 raise or lower the legs 51 and thus the stamping head plate 46. Head plate 46 may be guided in such vertical movement by means of top open ended slots 64 adapted to slidably receive guide bolts 65 carried at the top corner of plate 46. At the bottom of plate 46 and inwardly of connections 50 may be provided bottom opening guide slots 66 for slidable cooperation with bolts 67.

Motion of drive screw 60 is transmitted to the linkage on the opposite side of the stamping head by parallel transversely extending shafts 69 fixedly connected to ends of drive arms 55 and to ends of links 53'. Links 53' will thus impart lifting of lowering forces to legs 51' in accordance with turning of wheel 61.

The marking roll 18 may comprise a hollow cylindrical member 72 provided at each end which a stub shaft 73 which extends through respective slots 43 and 44 and which may be mounted in suitable end bearings 74 carried respectively by vertically movable plates 45 and 46. Each stub shaft 73 projects beyond bearings 74, one for carrying a sprocket 76 and the other for carrying a somewhat smaller diameter sprocket 77 for drive transmission purposes hereafter described.

On the cylindrical member 72 may be mounted a plurality of spaced marking wheel assemblies, each marking wheel assembly 80 being aligned with a row of pockets 30 on the conveyor. Each marking wheel assembly 80 may comprise a hub sleeve 81 adapted to be slidably axially positioned on cylindrical member 72. Sleeve 81 carries a plurality of angularly-spaced radial spider legs 82, each provided with an outer arcuate circumferentially extending wall 83 for mounting thereon a die member 84.

In this example, three die members 84 are shown, although it is understood that any number of die members may be employed as long as there is suitable correlation between the advancement of the fruit and the rotation of the marking roll means. Each die member 84 may comprise selected die characters 85 of relatively hard rubber-like material, such as 60 Shore, and integrally formed on and with a thin backing wall 86. Backing wall 86 may be suitably bonded, molded or vulcanized to a rectangular pad 87 of relatively soft flexible rubber material, such as 30 Shore. The bottom surface of pad 87 may be suitably bonded or otherwise connected to a thin metal plate 88 which may be perforated. Metal plate 88 provided means for suitably connecting each die member to wall 83 as by suitable screwbolt assemblies 89. It will be apparent that when a die member 84 is mounted on a wall 83, the outer surfaces of the characters 85 are curved at a uniform radius from the axis of cylinder 81.

It is important to note that the hub 81, spider legs 82, and the die members 84 are virtually embedded in a soft, deformable, resilient, spong-like rubber material, in this example, such material being formed as a pair of discs 90 encircling hub sleeve 81 and retained thereon by circular side plates 91 having a diameter substantially less than the diameter of discs 90. Circumferential edge surfaces 92 of discs 90 extend a preselected distance beyond the outer arcuate die surfaces of the die characters 85. The spaced discs 90 define therebetween an annular groove or channel 93, having a width more than twice the width of characters 85. This width and the distance which the surfaces 92 extend beyond the arcuate surface of characters 85 is sufficient so that when the surfaces 92 are deformed by contact with a fruit the inner portions of discs 90 defining the groove 93 will not bear against or contact the die characters 85 which would transfer ink to discs 90 and result in smudging of fruit surfaces. Groove 93 serves to permit the die faces to be supplied with ink as hereafter described.

Directly above the marking roll means 18, inking roll 19 may be mounted on a shaft 96 having opposite ends extending through slots 43 and 44 for limited axial slidable mounting on plates 45 and 46. Shaft 96 carries a roll of suitably impregnated inking paper 97, said paper roll 97 being positioned against an end plate 98 having an external hub 99 bored for a securement pin 100 which extends through shaft 96. Thus plate 98 fixes one end of inking paper roll 97 to shaft 96 for rotation therewith. At the opposite end of paper roll 97 may be provided an end plate 102 having a hub 103 provided with a threaded connection at 104 with axle 96 so that end plate 102 may be tightly urged against the opposed end of inking paper roll 97 for removably securing the roll 97 on axle 18 and for also permitting removal of the inking roll when the paper of roll 97 is expended.

Shaft 96 may be axially slidably mounted in suitable bearings 106 and 107 carried by flanged guide plates 108 and 109 having vertical sliding and guiding engagement with guide flanges 110 and 111 provided on the head plates 46 and 45, respectively. An adjustment nut and bolt assembly 112 at each plate 46 and 45 permits ready adjustment of the vertical spacing between the inking roll 19 and the marking roll 18.

Shaft 96 may be provided with a splined or polygonal shaft end 114 in the form of quadrant recesses providing an elongated driving connection as at 115 with a sprocket 116 which may be connected by a drive chain 117 to sprocket 77 carried by shaft 73 of the marking roll 18. Shaft 96 is thus rotated in selected relationship to the rotation of shaft 73 by the selected ratio between sprockets 77 and 116. The driving connection at 115 permits axial movement of shaft 96 while maintaining such connection.

At its opposite end shaft 96 supports a sprocket 118 driven by a chain connected with a sprocket 76 on shaft 73, sprocket 118 being rotatably and axially slidably mounted on shaft 96. Fixed to sprocket 118 may be a cylindrical cam 120 having a selectively pitched cam groove 121 cooperably receiving and being engaged by a cam follower 122 carried on an arm 123 fixedly connected to the end of shaft 96 as at 124. It will thus be apparent that as shaft 96 is driven through sprockets 77 and 116, the cylinder cam 120 is similarly driven through the sprockets 76 and 118, the ratios of such sprockets being so selected that the cam 120 rotates slightly faster than the shaft 96. As the marking roll 18 and inking roll 19 are rotated, the inking roll 19 will be axially oscillated at a selected rate of displacement in an axial direction to present successive annular incremental portions of the inking surface on the inking paper roll 97 to a transfer inking wheel 20 as hereafter described.

The ink transfer wheel 20 may be of a selected diameter sufficient to alternatively contact the surface of paper roll 97 and die face 85, with its axis parallel to and laterally offset from a vertical plane defined by the axes of the ink roll 19 and marking roll 18. The ink transfer wheel 20 may be made of any suitable material such as neoprene and is provided with a circumferential edge face 125 of approximately the same width as the die characters and readily receivable between or within the groove 93 and in spaced relation to the edge walls of the discs 90. Wheel 20 may be freely rotatably supported in bearings on an axle 127 received within a yoke-shaped end of a support arm 128 having its opposite end adjustably connected at 129 to an upwardly and forwardly extending support arm 130. Arm 130 is pivotally carried on a transverse shaft 131 extending between head plates 45 and 46. A spring 132 connected at 133 to the upper end of arm 130 may bias said arm 130 to normally urge the inking wheel 20 into desired pressure contact with the ink paper roll. The connection at 129 of the arms 130 and 128 may be adjusted to vary the included angle between said arms so as to readily adjust the inking wheel 20 to a selected spacing between the ink paper roll and the marking roll in order to achieve desired pressure contact of the wheel 20 with inking roll 19 and to move out of contact with roll 19 when the wheel contacts a die face 85.

Trough means 21 extends between the top end of the conveyor means 16 and the marking roll means 18 and passes therebeneath. It should be noted that the distance between the end of the conveyor means 25 and the marking roll 18 is relatively short and that a fruit discharged from a pocket 30 is directed downwardly along the trough means and beneath the marking roll which engages the fruit in a marking zone generally indicated by M.

Trough means 21 includes a fixed trough section 136 carried by a suitable channel section transverse through support frame member 137 on the side frames 33 and 34. The fixed trough section 136 has a generally shallow surfaced V configuration 138 aligned with a row of pockets 30 on the conveyor means. The V-surface 138 is provided with a selected angle of inclination, in this example, about 40 degrees with respect to the horizontal, in order to impart a selected velocity to each fruit discharged from a pocket 30.

A second trough section 140 includes a similar shallow V-section surface 141 longitudinally aligned with surface 138. Adjacent fixed section 138, one end of the second trough section 140 may be pivotally connected at 142 to member 137. Intermediate its ends, second section 140 has a depending leg 143 having its lower end connected at 144 to a relatively long forwardly and downwardly extending biasing spring 145 having at its other end a connection at 146 to an upstanding arm 147 fixed on a transverse shaft 148 extending between plates 43 and 44. A depending arm 149 may have its bottom end connected to a bolt 150 having an adjustment nut 151 for selectively turning shaft 148 to vary the tension of spring 145 and thereby vary the biasing force by which the trough surface 141 urges a fruit against the marking roll 118. Turning shaft 148 will simultaneously adjust tension of each spring 145 for each of the trough means 21 on the machine.

The free end of trough 140 may be provided with a depression or recess 153 so that a mark or stamp made upon a fruit by the die face 85 will not come in contact with or be marred by trough section 140 as the fruit is discharged therefrom.

Drive means for marking machine 15 may comprise a suitable motor 180 carried by frame means 35 and connected by suitable drive chains, sprockets, and drive gears generally shown to the conveyor means and to the marking roll and inking roll. Any suitable drive connection may be made to the shaft 73 as partially indicated by outer sprocket and drive chain 155, and by endless chain 117 extending between sprockets 77 and 116 on shafts 73 and 114 respectively and extending around spaced idler gears 158 and in marked engagement with a drive sprocket 159 on shaft 160 at the top end of the conveyor 25.

In operation, fruit to be marked is fed to the conveyor means 16 in suitable manner and is distributed over the conveyor means into pockets 30 as the top lay of the conveyor is advanced. The rate of movement of the top lay of the conveyor is correlated with the rotation of the marking roll means 18 so that a pocket 30 will be in a position at the top end of the conveyor means to discharge a fruit therefrom when a die member 84 is in proper position on the marking roll 18 to engage a fruit as it passes through the marking zone M. A fruit discharged from a pocket 30 falls onto the fixed trough section 136 and is directed downwardly at a selected velocity dependent upon the angle of inclination of the fixed trough section 136. This angle is critical and is carefully selected, having in mind the rate of advancement of fruit by the conveyor (e.g., 200 rolls per minute), the size and weight of the fruit, and the type of fruit. If the slope were too flat, a fruit discharged from a pocket 30 might tend to bounce on the fixed trough section and thus not be properly received by the marking roll 18 at the marking zone. Too steep a slope would increase the speed of the fruit beyond suitable control thereof. The slope selected permits movement of fruit toward the marking zone as uniformly as possible.

The second trough section 140 is likewise provided with a selected inclination or slope so that fruit received from the rather steeply inclined fixed trough section will be controllably advanced to the marking zone without bouncing or without erratic motion of the fruit. The slope of the second trough section should be as great as possible without causing a bounce-back of fruit when it contacts the marking roll. As a fruit enters the marking zone at a selected velocity and with the second trough section 140 biased toward the marking roll, it will be apparent that the soft deformable surfaces 92 will first engage surfaces of the fruit and be depressed by said fruit. The deformed surfaces 92 will thereby grip and hold a fruit at spaced areas on opposite sides of an area to be marked to insure its advancement beneath the marking roll. The soft gripping of a fruit at spaced surfaces and the V-section trough not only provide a guiding and alignment means for each fruit as it passes beneath the marking roll, but also serves to controllably reduce or increase the peripheral surface velocity of the fruit as it is rolling on the trough section 140 to that of the peripheral surface velocity of the curved die faces on the marking roll. Thus the soft, resilient, deformable surfaces of discs 90 tend to bring the die characters into proper stamping relation with the surface of the fruit under conditions whereby there will be a minimum or practically no relative movement between the fruit surface and the die face during the stamping operation. Likewise, since the fruit is grasped on opposite sides of the mark being made, there will be no lateral movement which would tend to blur, mar, or rub against a stamp being made.

It should be noted that fruit passing through the marking zone M and having a mark imprinted thereon will be discharged from the second trough section 140 at a point approximately directly between the axis of the marking roll and that such fruit will then drop to a discharge conveyor 162 having an angle of inclination of approximately the same as that of the second trough section so as to continue to advance the fruit and prevent any back-up or pile-up thereof.

The specific relationship of the fruit, marking roll, ink transfer wheel, and inking roll should be particularly noted. As described above, since the die is recessed in groove 93, initial contact is made with the fruit between the yieldable flange faces 92 which grip, drive and propel the fruit in a selected aligned controlled path in cooperation with the V-trough. Since the fruit is thus propelled and is rolled at a fruit peripheral surface speed which corresponds virtually to the peripheral speed of the die face because of such gripping, relative slippage or sliding of the die face on the surface of the fruit is virtually eliminated. It will be apparent that the die face does not serve the purpose of propelling the fruit and therefore wear on the die face is reduced and is limited to wear caused by actual imprinting contact with the fruit surface.

The die face 85 is contacted by the ink transfer wheel 20 in such a manner that only a thin film of ink is deposited on the die face. It should be noted that the wheel 20 is normally spring loaded against the inked surface 97 of the inking roll. Adjustment of wheel carrying arms 128 and 130 is made so that transfer wheel 20 will normally ride in selected pressure contact on the inked surface 97. When adjustment of the transfer wheel 20 is made so that it lightly contacts the die face, it will be apparent that at the time of initial contact of the die face 85 with transfer wheel 20, the transfer wheel will be urged rearwardly against the bias of spring 132 and will be moved slightly out of contact with the inked roll surface. Thus, at any one moment the ink transfer wheel contacts either the inked roll surface 97 or the die face 85 and both are not contacted at the same time. It should be noted that the inking roll and the marking roll are driven at selected speeds so that the peripheral speed of the inked surface 97 and the die face 85 are virtually the same. Since the ink transfer wheel 20 is freely rotatably mounted, the peripheral speed of the ink transfer wheel will be approximately the same as that of the inking roll and the die face so that when transfer of contact from surface 97 to face 85 is made as described above there will be relatively little or no slippage between the ink transfer face of wheel 20 and die face 85. It will be understood that the ink transfer face of the wheel may be of any suitable material to which the ink may adhere. In the specific example described above, the material of the ink transfer face may be softer than die face 85, as for example 50 Shore, and may be comparable to or less than the relative hardness of the die face.

It will be understood that the marking roll means may include any number, such as 16, of a plurality of marking rolls. For each of the 16 marking rolls, the above-described arrangement of the ink transfer wheel and inking roll means permits separate individual adjustment for each marking roll 80, and substantial flexibility and adaptability. Ink transfer wheels 20 are thus individually adjusted to a desired pressure contact against the inking roll surface 97 and die faces 85 and damage to the inking roll surface as by a transfer wheel pressing too hard thereagainst is obviated. Moreover, too great pressure on the inking roll surface may squeeze out ink and such excess ink carried by the transfer wheel would be deposited in excess upon the die character and ultimately result in a messy mark. It will be understood that the transfer wheel 20 is readily adjustable to any minor variations in the radial distance of the plurality of die faces carried by the marking roll. The adjustment of the transfer wheel with respect to the die face and the inking roll surface is sufficiently refined so that in the event the machine is permitted to operate without the passing of fruit beneath one or more marking rolls 80, the amount of accumulation of ink deposited on the die face will not become excessive so as to flow along sides of the die characters and may reach a condition where interchange of ink on the edge face of the transfer wheel and the inking roll surface is in substantial balance. Each die face 85 is thus maintained in a condition which will produce a clear distinct imprint on a fruit surface.

It will be readily apparent that when a different sized fruit is to be marked the machine may be readily adjustable to accommodate such different sized fruit by varying the vertical relationship of the marking roll 18 with respect to the trough section by varying the tension of the spring which biases the trough section and by regulating the speed at which the conveyor advances the fruit to the trough means. It should also be noted that as the inking roll means is oscillated axially and as the amount of ink deposited by the inking transfer wheel 20 requires adjustment, the inking roll 19 may be readily lowered to provide for such proper contact of the inking paper with the inking wheel. Likewise, when the outer turn of the inking paper roll is out of ink, then it may be readily torn off the roll to expose the unused next layer of inked paper.

It will be understood that various modifications and changes may be made in the stamping machine described above and also changes and modifications coming within the scope of the appended claims and embraced thereby.

I claim:

1. In a fruit-marking machine, the provision of: a driven rotating marking roll means; a conveyor means including a plurality of conveyor rollers for advancing a plurality of fruit to be marked; a trough support means; a trough means supported by said trough means at one end of the conveyor means to receive said fruit, said trough means including a fixed inclined trough section to impart a selected velocity to fruit received thereby, a second inclined trough section having one end pivotally connected with said trough support means adjacent the fixed trough section and having its other end extending beneath the marking roll means, said second trough section being normally biased upwardly about said pivotal connection toward said marking roll means, said second trough section having less inclination than said fixed trough section for imparting a selected velocity to the fruit as it approaches said marking roll means; said marking roll means including a soft yieldable resilient material having axially spaced circumferential gripping areas for gripping and propelling the fruit through and between said marking roll means and said second trough section; and die means carried by the marking roll means below the surface of the marking roll means and between said gripping areas, said gripping areas imparting to the fruit a fruit surface peripheral speed virtually equivalent to the surface speed of the die means.

2. In a fruit-marking machine, the provision of: a rotating marking roll means; a conveyor means for advancing a plurality of fruit to be marked toward said marking roll means; a trough support means; a trough means supported by the trough support means between said marking roll means and one end of said conveyor means to receive fruit discharged by said conveyor means, said trough means including a fixed inclined trough section to impart an initial velocity to fruit received thereby, a second inclined trough section having one end pivotally connected with said trough support means adjacent the fixed trough section and having its other end extending beneath the marking roll means, said second trough section being biased upwardly toward said marking roll means; said marking roll means including a soft yieldable resilient material having axially spaced circumferential gripping areas defining an annular groove and for gripping and propelling the fruit through said marking roll means and said second trough section; and die means carried by the marking roll means below the surface of said gripping areas and within said annular groove.

3. A fruit-marking machine, as stated in claim 2, including an inking roll means above said marking roll means; and an ink transfer wheel in intermittent contact with said inking roll means and having circumferential portions received within said annular groove for contact with said die means, said contact with said die means moving the transfer wheel out of contact with the inking roll means.

4. A machine, as stated in claim 1, including drive means for said marking roll means and said conveyor means for correlating discharge of said fruit from said conveyor means with rotation of said marking roll means, the inclinations of said first and second trough sections being selected so that the peripheral surface velocity of said fruit is substantially equivalent to the peripheral surface velocity of the marking face of said die means, the yieldability of said soft gripping areas being adapted to reduce to a minimum interfacial relative movement between said die means and said fruit surface.

5. In a marking assembly for articles, the provision of: a die carrying rotatably driven marking roll means comprising a cylindrical body having deformable, yieldable, resilient spaced article-gripping surfaces providing an annular channel therebetween, a die member carried within the channel and below said gripping surfaces, a trough support member, inclined trough means supported by said support member and disposed below said marking roll means and normally biased upwardly toward said marking roll means, said trough means including a fixed, relatively steep trough portion to initially receive articles to be marked, and an elongated trough section of relatively shallow inclination and terminating below said marking roll means; said elongated trough section being pivotally connected with said trough member and extending beneath said fixed trough section; an inking roll above said marking roll means and an ink transfer wheel in alternate engagement with the inking roll and with the die member and extending into said annular channel for inking said die member.

6. A marking assembly as stated in claim 5 including link means for adjustably mounting said ink transfer wheel for cooperable alternate selected pressure contact with said inking roll and said die member.

References Cited by the Examiner

UNITED STATES PATENTS

| | | | |
|---|---|---|---|
| 625,318 | 5/1899 | Bradford | 101—350 |
| 1,183,623 | 5/1916 | Blaine | 101—350 |
| 1,284,031 | 11/1918 | Ahlbrug | 101—35 |
| 1,518,006 | 12/1924 | Sevigne | 101—40 |
| 1,549,595 | 8/1925 | Merrill | 101—40 |
| 1,656,494 | 1/1928 | Nutt et al. | 101—40 |
| 1,733,716 | 10/1929 | Black | 101—350 |
| 2,326,954 | 8/1943 | MacAnlis | 101—35 |
| 2,424,006 | 7/1947 | Verrinder | 101—376 X |
| 2,530,282 | 11/1950 | Brodie et al. | 101—350 |
| 2,584,092 | 1/1952 | Keller et al. | 101—38 |
| 2,631,535 | 3/1953 | Mumma | 101—376 |
| 2,716,379 | 8/1955 | Pitt | 101—329 X |
| 2,741,297 | 4/1956 | Vamvaketis | 101—379 X |
| 2,749,838 | 6/1956 | Stover | 101—35 |
| 2,825,278 | 3/1958 | Schwisow | 101—35 |
| 2,982,203 | 5/1961 | Ahlburg | 101—376 X |
| 2,987,991 | 6/1961 | Johnson et al. | 101—376 X |
| 2,994,266 | 8/1961 | Sparrow | 101—380 |
| 3,080,812 | 3/1963 | King | 101—36 |
| 3,083,636 | 4/1963 | Carkhuff | 101—37 |

ROBERT E. PULFREY, *Primary Examiner.*

ROBERT A. LEIGHEY, WILLIAM B. PENN,
*Examiners.*